United States Patent [19]

Smith

[11] Patent Number: 4,623,810
[45] Date of Patent: Nov. 18, 1986

[54] IMPROVED HEAT SINK AND SHAFT BEARING SUPPORT FOR THERMO-PLASTIC HOUSING

[75] Inventor: Peter B. Smith, Tarboro, N.C.

[73] Assignee: Black & Decker Inc., Newark, Del.

[21] Appl. No.: 696,633

[22] Filed: Jan. 30, 1985

Related U.S. Application Data

[60] Division of Ser. No. 538,439, Oct. 3, 1983, abandoned, which is a continuation of Ser. No. 209,052, Nov. 21, 1980, abandoned.

[51] Int. Cl.$^4$ .......................... H02K 5/16; F16C 35/02
[52] U.S. Cl. ........................................ 310/90; 310/43; 310/50; 384/278
[58] Field of Search ............ 310/42, 90, 91, 43; 29/505, 509, 511, 513, 521; 384/278, 438, 493, 557

[56] References Cited

U.S. PATENT DOCUMENTS

| | | |
|---|---|---|
| 722,875 | 3/1903 | Naef . |
| 1,359,898 | 11/1920 | Jenkins et al. . |
| 1,473,827 | 11/1923 | Mills . |
| 1,990,035 | 2/1935 | Kratz et al. ............... 172/36 |
| 2,082,264 | 6/1937 | Scruggs .................... 172/36 |
| 2,090,251 | 8/1937 | Cowles ..................... 29/511 |
| 2,228,104 | 1/1941 | Baudry ..................... 171/252 |
| 2,238,925 | 4/1941 | Brown ...................... 171/252 |
| 2,294,713 | 9/1942 | Boerger .................... 30/195 |
| 2,406,150 | 8/1946 | Kennedy ................... 172/36 |
| 2,532,823 | 12/1950 | Schumann ................ 172/36 |
| 2,768,725 | 10/1956 | Foulds et al. .............. 29/511 |
| 3,051,373 | 10/1962 | Soumerai .................. 230/206 |
| 3,080,106 | 3/1963 | Ayling ...................... 230/206 |
| 3,163,195 | 12/1964 | Croswell ................... 29/511 |
| 3,198,132 | 8/1965 | Zalis ......................... 103/204 |
| 3,213,914 | 10/1965 | Baumle et al. ............ 29/521 |
| 3,220,092 | 11/1965 | Wolfe et al. ............... 29/149.5 |
| 3,252,020 | 5/1966 | Consoli ..................... 310/64 |
| 3,319,093 | 5/1967 | Abdul ....................... 310/43 |
| 3,436,803 | 4/1969 | Sarnoff ..................... 29/511 |
| 3,466,478 | 9/1969 | Gail .......................... 310/90 |
| 3,515,918 | 6/1969 | Otto .......................... 310/90 |
| 3,818,255 | 6/1974 | Wagner ..................... 310/50 |
| 3,824,684 | 7/1974 | Wheeler .................... 310/42 |
| 3,831,048 | 8/1974 | Wagner ..................... 310/90 |
| 3,845,336 | 10/1974 | Moores, Jr. et al. ....... 310/52 |
| 3,871,069 | 3/1974 | Grieb ........................ 310/90 |
| 3,959,677 | 5/1976 | Brieg ........................ 310/90 |
| 4,385,276 | 5/1983 | Bitzel ........................ 310/47 |
| 4,427,911 | 1/1984 | Manson .................... 310/42 |

FOREIGN PATENT DOCUMENTS 0052970 6/1982 European Pat. Off. ............ 384/278

Primary Examiner—Patrick R. Salce
Assistant Examiner—D. L. Rebsch
Attorney, Agent, or Firm—Finnegan, Henderson, Farabow, Garrett & Dunner

[57] ABSTRACT

An improved heat sink and bearing support arrangement for an armature shaft of an electric motor in an electrically actuated device which comprises a thin walled body fabricated by sheet metal processes. In a preferred embodiment, the support body has a generally mushroom shaped configuration which includes integrally formed central, shoulder and collar segments. A bearing body is supported by the central segment and the collar segment engages a housing for supporting the assembly in the device.

4 Claims, 22 Drawing Figures

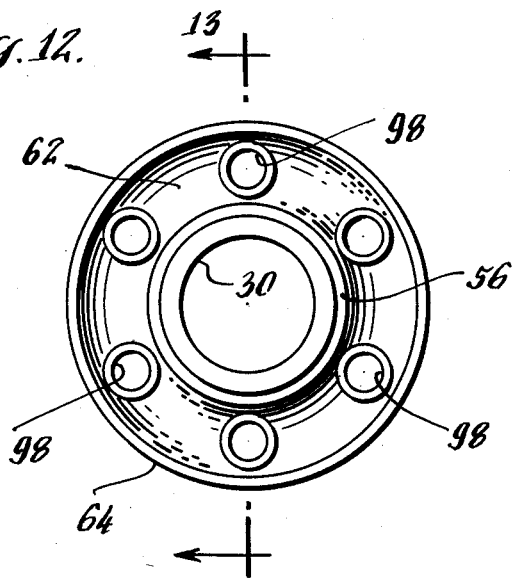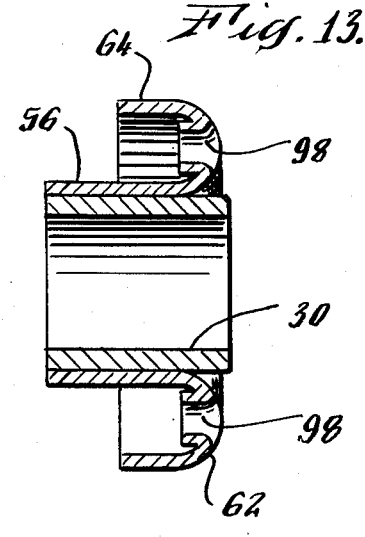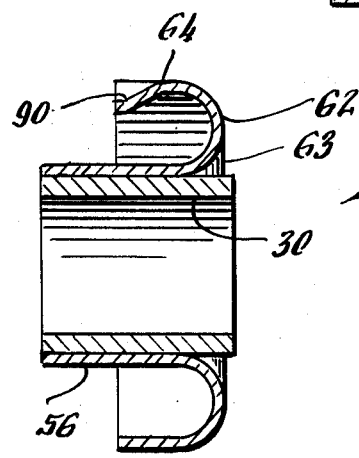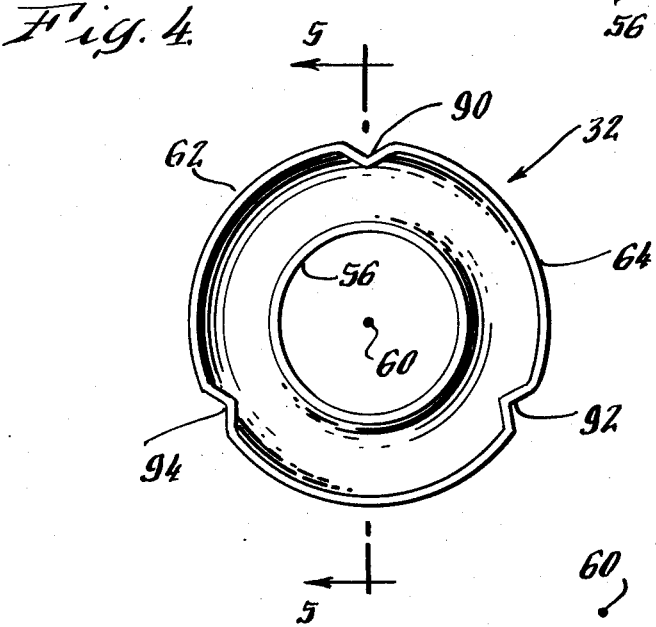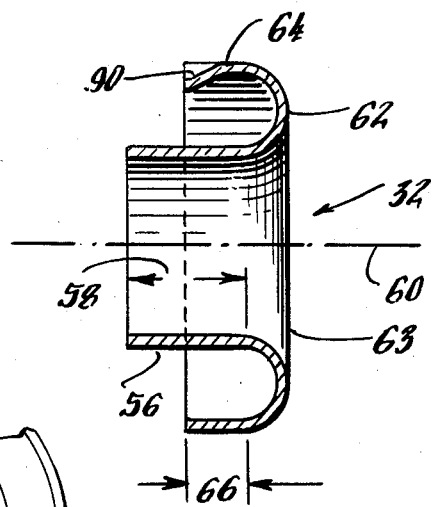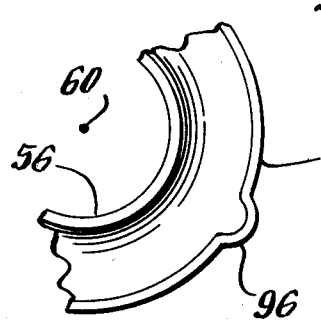

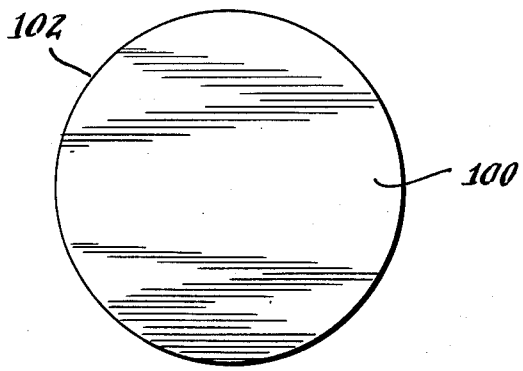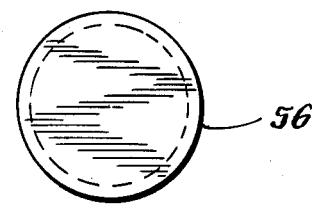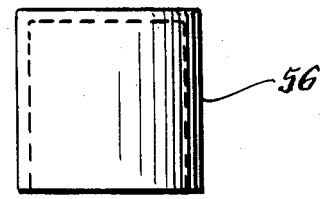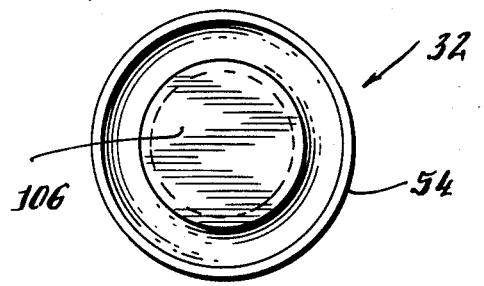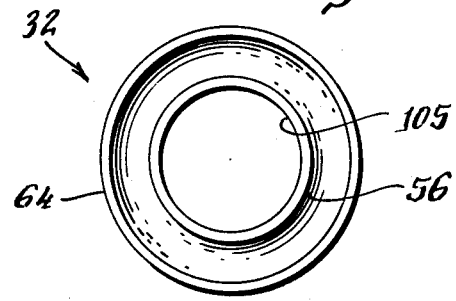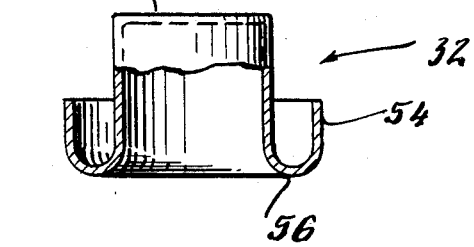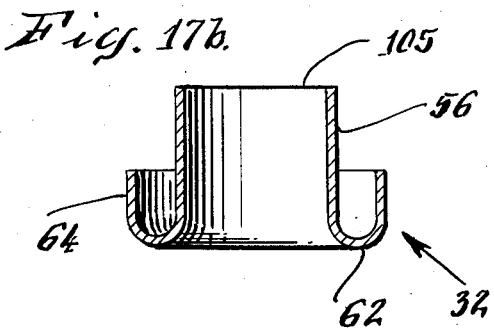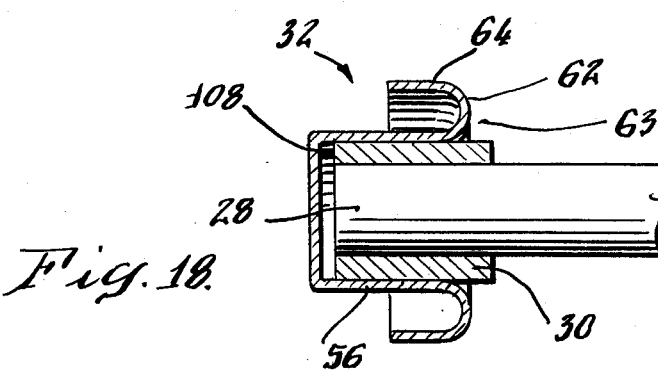

IMPROVED HEAT SINK AND SHAFT BEARING SUPPORT FOR THERMO-PLASTIC HOUSING

This is a division of application Ser. No. 538,439, filed Oct. 3, 1983, which is a continuation of Ser. no. 209,052, filed Nov. 21, 1980, both abandoned.

BACKGROUND OF THE INVENTION

1. Field of the Invention

This invention relates generally to electric motor actuated devices of the type having an armature shaft which is rotatably supported by bearings mounted in a housing of the device. The invention relates more particularly to an improved bearing support arrangement.

2. Description of the Prior Art

An armature shaft of an electric motor used with devices such as portable, hand held, electrically powered tools is supported at opposite ends of the shaft by sleeve bearings which are mounted in a housing of the device. One example of such a device is a portable electric, hand held drill. The housing for the device has frequently been fabricated of a thermoplastic material which provides various beneficial characteristics. However, a thermoplastic material is a relatively poor conductor of heat and the housing does not readily permit conduction from the armature bearing of heat generated by the frictional engagement between the bearing body and rotating armature shaft. The bearing body is thus suceptible to operating at an elevated temperature and can experience a relatively shortened operating life.

A support body which both supports the sleeve bearing body in the housing and conducts heat from the bearing body is known. This type of bearing support body provides a heat sink for the bearing body. A flow of thermal energy from the bearing body to the support body and the combined cooling of the bearing and support bodies, principally through convection by flowing air, thus permits the bearing to operate at desired temperatures. One such form or bearing support and heat sink is described in U.S. Pat. No. 3,824,684 which is assigned to the assignee of this invention. Bearing supports of this type depend in large part for the desired cooling effect on the relatively large thermal mass of the support body. In addition to the desired heat conduction and heat dissipation the relatively large mass support body provides a relatively rigid support for the bearing body.

While providing these beneficial characteristics, the heat sink support body also exhibits some other less desirable factors including cost, interface with the housing and structural rigidity. More particularly, these heat sink support bodies are relatively costly in terms of both the quanity of the material required for the support body itself and the cost of fabrication by casting and finishing. Devices of the type employing the heat sink support body are generally made in relatively large production quantities. Unit cost increments for members of the device can be reflected in terms of relatively large dollar amounts in view of large production quantities and thus each incremental increase or decrease in cost can be reflected in relatively large overall increases or decreases for the production quantities involved. The interface between the bearing support body and the thermoplastic housing is also important. The fabrication of prior heat sink support bodies generally requires a careful processing of the support body during fabrication to avoid an assymetrical body which can result in uneven heating of the body. Such uneven heating causes nonuniform stressing of the body and at times a cracking of the thermoplastoc housing. Additionally, while the support body provides a desired rigid support for the bearing, its rigidity can be disadvantageous in that it permits little yield when manufacturing variations occuring in the cavity impede placement of the bearing body therein. Thus, in order to avoid this potential problem, the cylindricity of the cavity in the support body is accurately formed and the cost of the device is increased.

Another form of heat sink which functions both to support and cool the bearing is provided by a plurality of members rather than a single body. The complexity of this multipiece support and heat sink arrangement is undesirable in that the materials, fabrication, and assembly thereof become relatively costly and thermal transfer contact surfaces between the members introduces undesired resistances to the conduction of the heat.

SUMMARY OF INVENTION

Accordingly, it is an object of this invention to provide an improved motor armature shaft bearing support arrangement in an electrically actuated device.

Another object of the invention is provide an improved heat sink and bearing support arrangement in an electrically actuated device.

Another object of the invention is to provide a heat sink support body for an armature shaft bearing body which can be fabricated relatively economically.

Still another object of the invention is to provide a heat sink support body for an armature shaft bearing body which exhibits ductility.

A further object of the invention is to provide a heat sink support body for an armature shaft bearing body which facilitates mounting and alignment of the bearing body therein.

Another object of the invention if to provide an improved support for a sleeve bearing in a thermoplastic housing of an electrically energized device.

Another object of the invention is to provide an improved electrically actuated device.

In accordance with features of the invention, an improved heat sink and bearing support arrangement for an armature shaft of an electric motor in an electrically actuated device comprises a relatively thin-walled, single-piece body having a first, integrally formed segment means for receiving and supporting a bearing body and a second integrally formed segment means for mounting the first segment means to a housing of the device in axial alignment with an armature shaft of the device. The first segment means compromises a centrally located, longitudinally extending segment which receives and supports a bearing body. The second segment means comprises a shoulder segment formed integrally with the central segment and extending transversely therefrom, and a collar segment integrally formed with the shoulder segment and extending longitudinally therefrom and about the central segment. The collar segment which is spaced transversely from the central segment is adapted to engage the housing of the device for supporting and positioning a supported bearing body in alignment with the armature shaft. In a preferred embodiment of the invention, a heat sink support body is formed of sheet metal and the desired support, rigidity and ductility are provided by a generally mushroom shaped configuration. A tubular shaped central segment supports a sleeve bearing therein and a generally circular shaped collar segment is concentrically aligned with the tubular segment.

In accordance with other more particular features of the invention, a means is provided for inhibiting rotation of the support body in the housing. A plurality of cooling apertures are formed in the body for enabling air flow through the support body and enhancing its cooling.

Cooling of the bearing body is accomplished by conduction of thermal energy from the bearing body to the heat sink support body. The support body provides a relatively large surface area which is exposed to the flow of cooling air and thus maintains the bearing body at the desired operating temperature. The heat sink support body of the invention is relatively economical in that it is fabricated of a thin walled sheet metal material and is formed by the relatively less expensive sheet metal forming processes. A heat sink support body is thus provided which utilizes a relatively low mass of material and which can be formed at a relatively low cost. The thin-walled support body exhibits a ductility which facilitates positioning the bearing body therein when manufacturing deviations from cylindricity occur while at the same time providing a desired rigidity for supporting the bearing and rotating armature shaft. A thin wall additionally eliminates non-uniform heating and any accompanying undesired stresses upon the housing of the device.

BRIEF DESCRIPTION OF THE DRAWING

These and other objects and features of the invention will become apparent with reference to the following specification and to the drawings wherein:

FIG. 4 is an end view of the heat sink support body of FIG. 1;

FIG. 5 is a view taken along line 5—5 of FIG. 4;

FIG. 6 is a sectional view similar to FIG. 5 and illustrating a bearing body positioned in the support body;

FIG. 7 is a fragmentary view of a segment of the bearing support of FIG. 4 illustrating an alternative embodiment of a means for inhibiting rotation of the support in a housing;

FIG. 12 is an end view of an alternative embodiment of the heat sink support body of the present invention;

FIG. 13 is a view taken along lines 13—13 of FIG. 12;

FIGS. 14 through 17 are views of the support body of the invention at various stages during the fabrication process; and FIG. 18 is a side view in section illustrating an alternative embodiment of the heat sink support body arrangement of the present invention.

DETAILED DESCRIPTION

Figure 1:
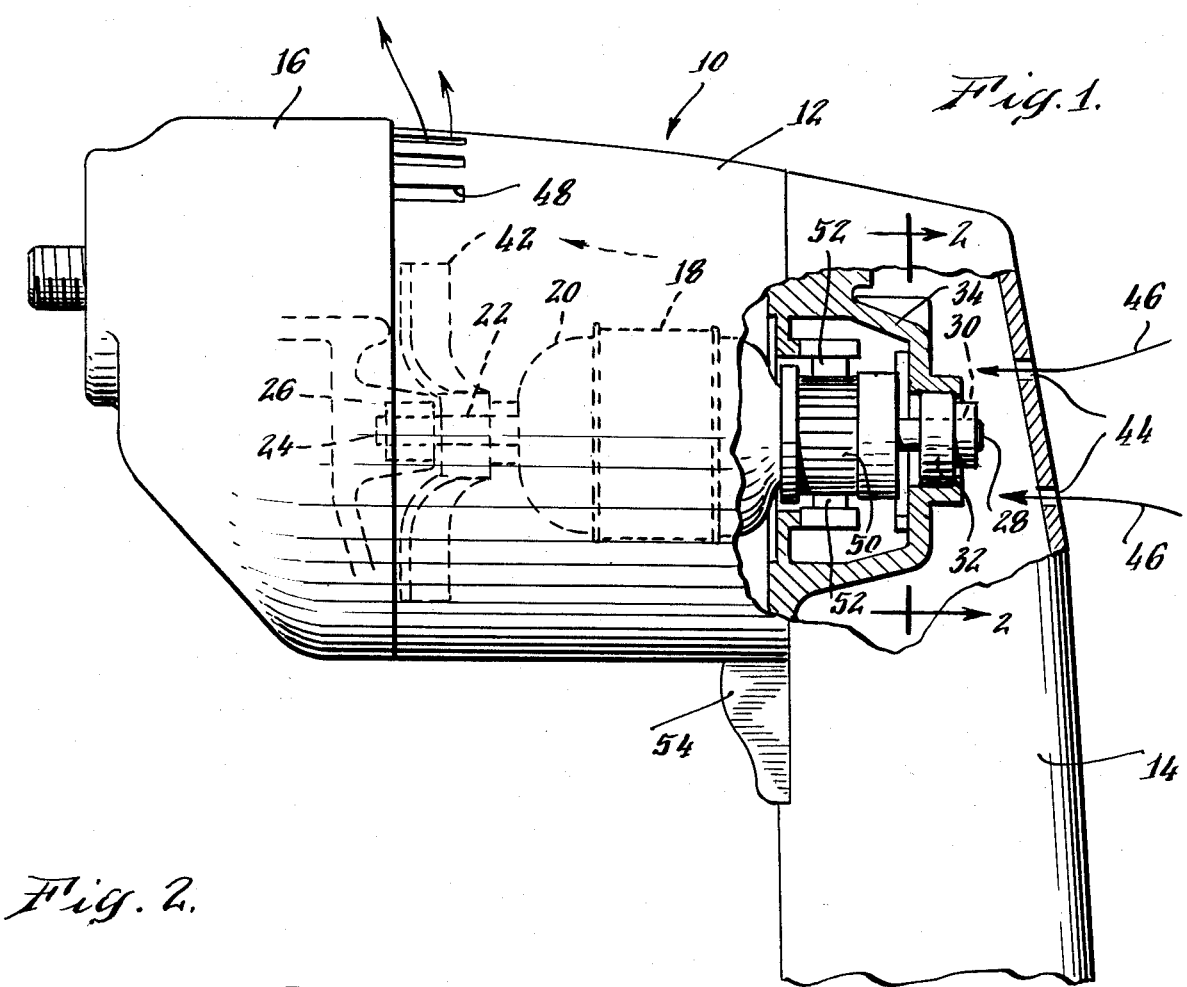
FIG. 1 is a fragmentary side elevation view, partly broken away and partly in section, of a portable electric tool illustrating one embodiment of the present invention.
Figure 2:
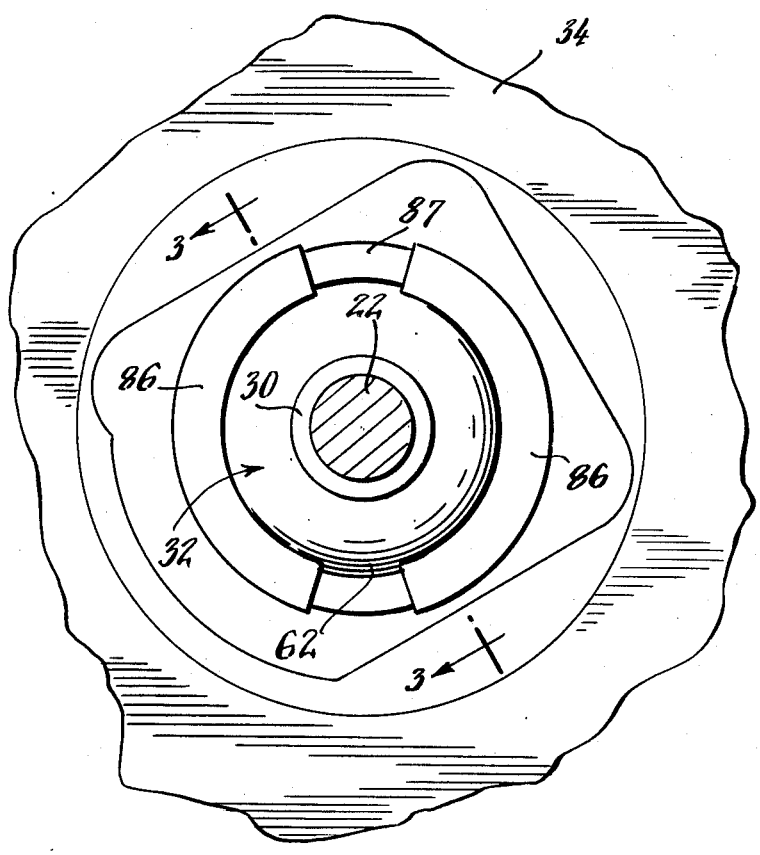
FIG. 2 is an enlarged fragmentary view of the device of FIG. 1 taken along line 2—2 of FIG. 1.
Figure 3:
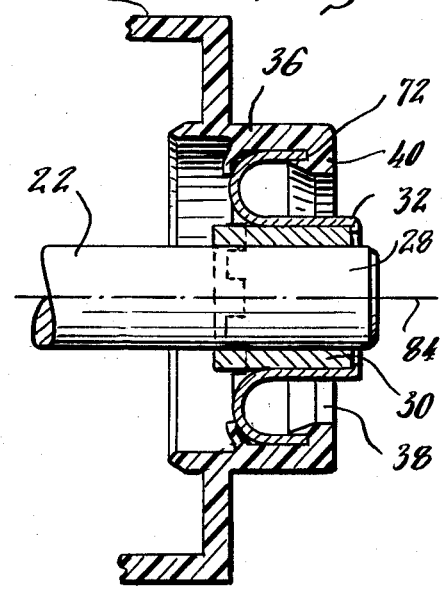
FIG. 3 is a fragmentary view, partly in section, taken along line 3—3 of FIG. 2.

Referring now to the drawings and particularly to FIGS. 1-3, an electrically actuated device with which the present invention is useful is shown to comprise a portable, hand held power tool 10. While the particular power tool 10 illustrated in FIG. 1 is shown to be a portable drill, the tool 10 is exemplary and other forms of electric devices can also make beneficial use of the present invention. Power tool 10 includes a molded thermoplastic housing 12 having a handle 14 and a gear case 16 which is mounted to the housing. An electric motor 18 is positioned within the housing 12 and includes an armature 20 having a shaft 22. One end 24 of the shaft 22 is supported in a bearing 26 which is mounted in the gear case 16. An opposite end 28 of the shaft 22 is rotatably supported in a sleeve bearing 30 positioned, as indicated in greater detail hereinafter, in a heat sink support body 32 and mounted to a housing bridge segment 34. This bridge segment is formed integrally with the thermoplastic motor housing 12 and includes a tubular shaped segment 36 in which the support body 32 is mounted. Support body 32 extends partly through an aperture 38 formed at one end 40 of the tubular segment 36. A fan 42 is mounted for rotation with the armature shaft 22 near the forward end 24. Upon excitation of the motor 18, the fan rotates to establish a flow of cooling air inwardly through apertures 44 formed in the handle as indicated by the arrows 46, past the bearing and support bodies 30 and 32 respectively and over and through the motor 18. This cooling air is discharged radially through apertures 48 formed near a forward part of the housing 12. As illustrated in FIG. 1, the motor 18 further includes a commutator 50, contact brushes 52 and a trigger switch 54 for control and operation of the power tool 10.

The bridge segment 34 which positions and supports the armature shaft bearing 10 is constructed of the same thermoplastic material as the motor housing 12. Thermoplastics are poor heat conductors and care must be taken to adequately dissipate heat generated at the sleeve bearing 30 resulting from rotary frictional engagement between the end 28 of the armature shaft 22 and the bearing 30. A substantial heat buildup at this bearing, if not dissipated, can soften and distort the thermoplastic bridge segment 34, resulting in a misalignment of the bearing with the armature shaft 22 and cause cumulative heating and wear which shortens the operating life of the tool.

Heat sink support body 32, in accordance with the present invention, supports the bearing 30 on the bridge segment 34 of the housing 12. As best illustrated in FIGS. 3-6, the support body 32 includes an elongated, central segment 56 having a length 58 which extends in the direction of the support body's longitudinal axis 60. A shoulder segment 62 is integrally formed with the central segment 56 and extends transversely therefrom about the axis 60. The support body also includes an elongated collar segment 64, having a length 66, which is integrally formed with the shoulder segment 62 and extends therefrom in the direction of the longitudinal axis 60 and about the central segment 56.

In a preferred embodiment, as illustrated in the drawings, the central segment 56 is symmetrical about the axis 60. The central segment 56 as shown is generally cylindrical and is tubular shaped. The shoulder segment 62 is generally circular shaped; it is symmetrical about the axis 60; and it has a curved or crowned configuration which extends in a direction parallel to the axis 60. The collar segment 64 is generally annular shaped and, as shown comprises a circular or ring shaped segment. It is spaced transversely from the tubular central segment 56 and is concentric therewith. The preferred embodiment of the heat sink support body 32, as illustrated in FIG. 5, thus has a generally mushroom shaped configuration. Configurations other than the general mushroom shape can be provided in accordance with the invention. For example, the length of the collar segment 64 may be substantially larger than that illustrated in FIG. 5 and depending on the application, can be equal to or greater than the length 58 of the central segment 56.

The heat sink support body 32, in accordance with the invention, is formed of a relatively thin walled material, as for example, a sheet metal. While various materials can be utilized, the material preferably exhibits heat transfer characteristics which enable thermal energy generated by the rotating armature shaft in the bearing 30 to transfer from the bearing 30 to the support body 32. Various metals can be utilized and a preferred material is sheet steel. As used herein and in the appended claims, the expressions thin walled and sheet metal refer to a metal sheet having a thickness in the range of not less than about 0.010 inches and not greater than about 0.125 inches. The thickness of the sheet metal selected within this range will, for a particular application, depend upon the diameters of the central segment 56 and the diameter of the collar segment 64. In a support body 32 with a tubular shaped segment 56 having a diameter of about one half inch and a collar segment 64 having a diameter of about one inch, the thin-walled material fabricated of sheet steel has a preferred thickness of about 0.020 inches.

The thin-walled support body is conveniently fabricated by sheet metal processes. While the body 32 can be fabricated by a one step forming procedure, the configuration of the body 32 during a sequence of discrete forming steps is illustrated in FIGS. 14–17. A plate strip of sheet metal stock (not shown) from which the support body 32 is formed is initially stamped to provide a circular disc 100 (FIG. 14) with a relatively well formed outer circular edge 102. The disc 100 is then drawn to form the elongated tubular shaped central segment 56 (FIG. 15). The body of FIG. 15 is then formed to provide the collar segment 54 and the shoulder segment 56 (FIG. 16). At this stage of the fabrication process, the body 32 has a generally top hat configuration as is illustrated in FIG. 16. The central segment 56 is generally tubular shaped with an integral closure 106 at one end. An aperture 105 is then formed in the central segment as is illustrated in FIG. 17. A tubular sleeve bearing 30 which is formed of a suitable, well known, bearing material such as a sintered brass is then pressed into the tubular segment 56, as is illustrated in FIG. 6 with entry from the end 63. The support body 32 with bearing 30 positioned therein is then mounted to the bridge segment 34 of the tool housing 12.

Figure 11:
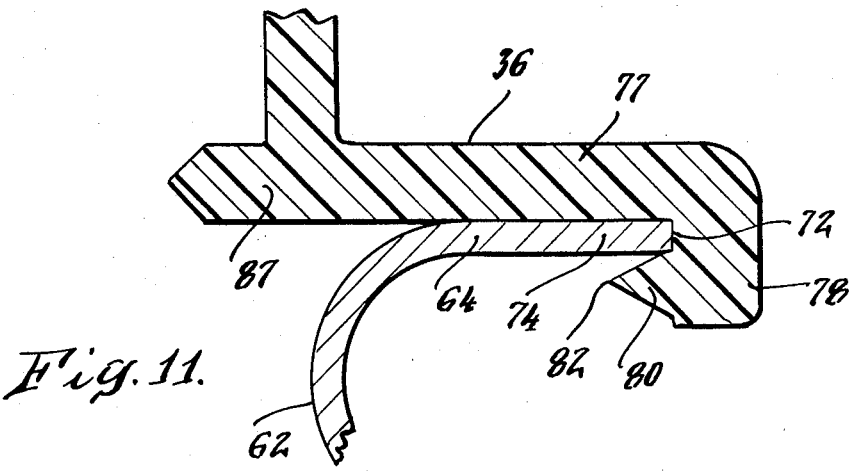
FIG. 11 is an enlarged fragmentary view of a segment of FIG. 1 illustrating placement of the support body in the device housing prior to deformation of captivating housing segments.

Referring now to FIGS. 3 and 11, the tubular segment 36 of the bridge 34 is shown to include an inner, integrally formed circular cavity 72 which receives a lower segment 74 of the collar segment 64. As best seen in the enlarged view of FIG. 11, the bridge segment includes a wall segment 77, a radially extending segment 78, and a longitudinally extending, annular-shaped, rib segment 80 which is integrally formed with, and, extends from the segment 78. The rib segment 80 is wedge shaped in cross section and includes a distal crest or point 82. The segments 77, 78 and 80 define an inner, annular shaped cavity 72 of the tubular bridge segment 36. Upon assembly, support body 32 is initially forced into the tubular segment 36 and the collar edge segment 74 is positioned in engagement with the circular cavity 72. Longitudinal movement of the support member 32 in an axial direction is limited by the segment 78. When so placed, the axis 60 of the support body 32 is concentrically aligned with the axis 84 (FIG. 3) of the armature shaft 22.

Figure 8:
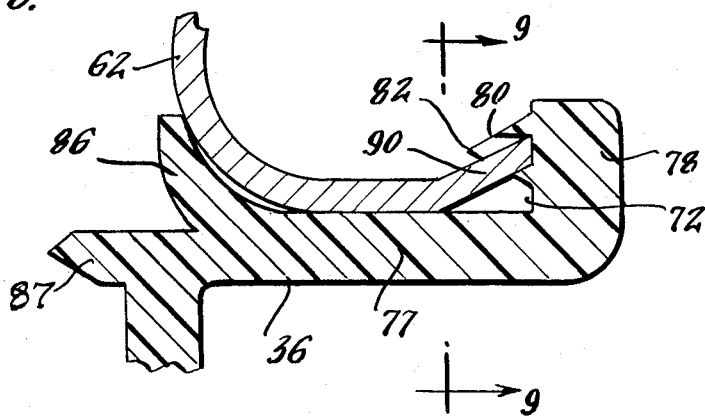
FIG. 8 is an enlarged fragmentary view of a segment of the device of FIG. 1 illustrating in detail the engagement between support collar and housing.
Figure 10:
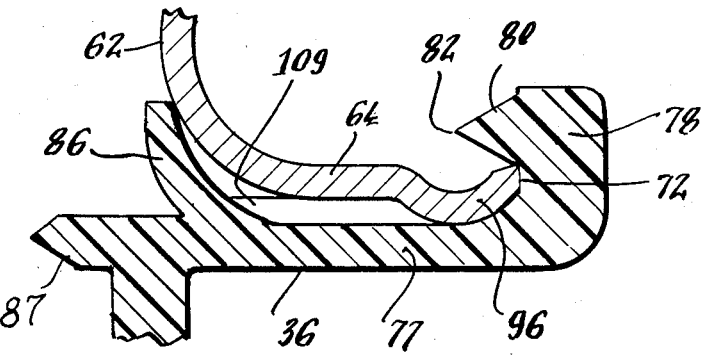
FIG. 10 is an enlarged fragmentary view of a segment of the device of FIG. 1 illustrating in detail an alternative engagement between support collar and housing.

A means for captivating the support body 32 which is positioned in the cavity 72 is provided by a circular array of bosses 86 which are integrally formed with, and extend from a segment 87 of the thermoplastic tubular segment 36. After placement of the support body 32 within the circular cavity 72, the two bosses 86 are formed. Each of the bosses extends for an arcuate distance of about 150° (FIG. 2) and are positioned longitudinally adjacent the shoulder segment 62 of the support body. The bosses 86 are formed by cold working the thermoplastic segment 87 to partially deform the segment 87 in a transverse direction. The deformed, transversely-extending segments comprise the bosses 86. Bosses 86 alternatively comprise a circular array of a plurality of bosses, or, alternatively, boss 86 comprises a continuous ring shaped boss having a notch formed therein along its circumference. The bosses 86 extend over a part of the surface of the collar segment 62 and captivate the support body 32 in the tubular segment 36. FIG. 11 is a sectional view of a boss 36 after placement of the support body 32 in the cavity 72 and prior to deforming by cold working. After cold working, the deformed bosses 86 engage the outer, upper surface of the shoulder segment 62 and captivate the support body 32 in the tubular segment 36. FIGS. 8 and 10 illustrate engagement between a deformed boss 86 and the surface of the shoulder segment 62. FIG. 2 illustrates the deformed array of bosses 86.

Figure 9:
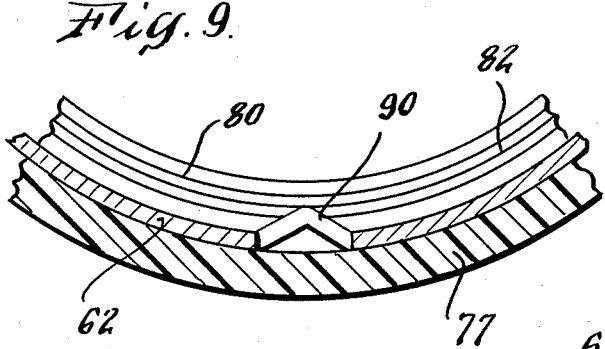
FIG. 9 is a sectional view taken along lines 9—9 of FIG. 8.

A means is provided for inhibiting rotation of the support body 32 in the tubular segment 36. This means comprises a protrusion extending from the support body which engages a surface of the tubular housing segment 36 and inhibits rotation. In a preferred embodiment, the means for inhibiting rotation comprises a protrusion extending transversely from the collar segment 64. Referring now to FIGS. 4, 5, 8 and 9, a protrusion is shown to comprise a wedge shaped boss 90 which extends transversely inwardly from the collar segment 64. Preferably, a plurality of such protrusions are provided as is illustrated by the wedge shaped protrusions 90, 92 and 94 in FIG. 4. These protrusions which are integral with the collar segment 64 are conveniently formed during the forming operation upon formation of the disk 100, referred to hereinbefore. The wedge shaped bosses 90, 92, and 94 engage the rib segment 80 upon placement of the body 32 in the cavity 72. Placement of the body 32 causes deformation of the thermoplastic material and causes the rib segment to assume the shape of the boss as is best illustrated in FIGS. 8 and 9. The deformed thermoplastic material thus engages the protrusions and inhibits rotation of the body 32 about its axis 60 within the cavity 72.

Protrusions for inhibiting rotation of the support body 32 may take forms and configurations other than that shown in FIG. 4. Depending on the particular application, the protrusions for example, may be formed in the central segment 56 along its length or even along an edge of the central segment 56 when these surfaces are juxtaposed with a surface of the housing. FIG. 7 illustrates an alternative protrusion arrangement wherein the protrusion comprises a dimpled or curve shaped boss 96 extending transversely and outwardly from the axis 60 of the body. FIG. 10 illustrates the placement and deformation of the wall of the tubular segment 36 by a support body 32 having the protrusion of FIG. 7. A restraining groove 109 is formed in the wall during placement.

An alternative arrangement for the support body 32 is illustrated in FIG. 18. In this arrangement, an aperture is not formed in a central segment 56 and a closure 106 is provided at one end of the segment. The support body 32 in this arrangement is fabricated by the steps illustrated in FIGS. 14, 15, and 16. The bearing body placed in the segment 56 is positioned so that a distal end 108 of the bearing is spaced from the closure 106 of the central segment. This arrangement is advantageous for use with armature shafts which do not extend fully through the support body. The spacing between the end closure 106 and the distal segment 108 of the bearing is advantageous in that a lubricant deposited therein is captivated and provides for long term lubrication of the bearing as desired.

In an alternative embodiment of the support body of the invention a means is provided for enabling air flow through the support body itself. This means comprises an aperture formed in the body 32. Preferably, a plurality of the apertures are formed as is illustrated in FIG. 12 and 13 by the circular array of apertures 98 formed in the shoulder segment 62. These apertures enable the flow of air through the support body itself and increase the contact of cooling air with the surfaces of the support body 32 thus enhancing cooling. The edges of these apertures which need not be accurately formed since their function is simply to provide an air passage can be formed during the fabrication process referred to hereinbefore.

There has thus been described an improved heat sink support arrangement for supporting a rotating armature shaft in an electrically actuated device. The heat sink support body described is advantageous in that it can be fabricated at reduced cost in terms of the quantity of material required as well as economy of fabricating processes utilized in forming the support body. While providing the desired rigidity for supporting the bearing and the armature shaft in the housing of the device, the support body which is formed of a thin walled material provides ductility thereby facilitating placement of its bearing body in the support body. The described arrangement provides a surface area exposed to a flowimg air medium which maintains the bearing at a desired operating temperature. Further features of the invention provide means for inhibiting rotation of the support body when mounted in the housing for the device and enhancing cooling by forming apertures in the support body.

While there is described herein preferred embodiments of the invention, it will be appreciated by those skilled in the art that variations may be made thereto without departing from the spirit of the invention and scope of the appended claims.

What is claimed is:

1. An electrically-operated, portable tool comprising:
   (a) an electric motor including an armature shaft journaled at one end in a bearing body;
   (b) a thin-walled, single piece metal body supporting said bearing body, said metal body including central, shoulder and collar segments, the central and collar segments extending longitudinally parallel to and concentrically about the axis of said shaft with the collar segment being radially outwardly spaced from the central segment, and the shoulder segment extending transversely to join said central and collar segments, said bearing body being positioned in said central segment;
   (c) a thermoplastic housing including a flange extending radially inwardly toward said axis and a rib segment axially extending from said flange, said flange and rib segment defining an annular cavity concentric with said axis, the collar segment of said metal body being positioned in said cavity and engaging said housing to axially align said metal body with said shaft; and
   (d) means for captivating said metal body in said housing.

2. The tool of claim 1 wherein said captivating means is a boss integral with said housing, extending radially inwardly of said axis, and being axially spaced from said cavity, said boss engaging said shoulder segment.

3. The tool of claim 2 wherein said captivating means comprises a plurality of bosses cold worked from the thermoplastic material of said housing.

4. The tool of claim 1 wherein said thin-walled metal body includes a protrusion formed in said collar segment for engaging said housing and inhibiting rotation of said metal body.

* * * * *